UNITED STATES PATENT OFFICE.

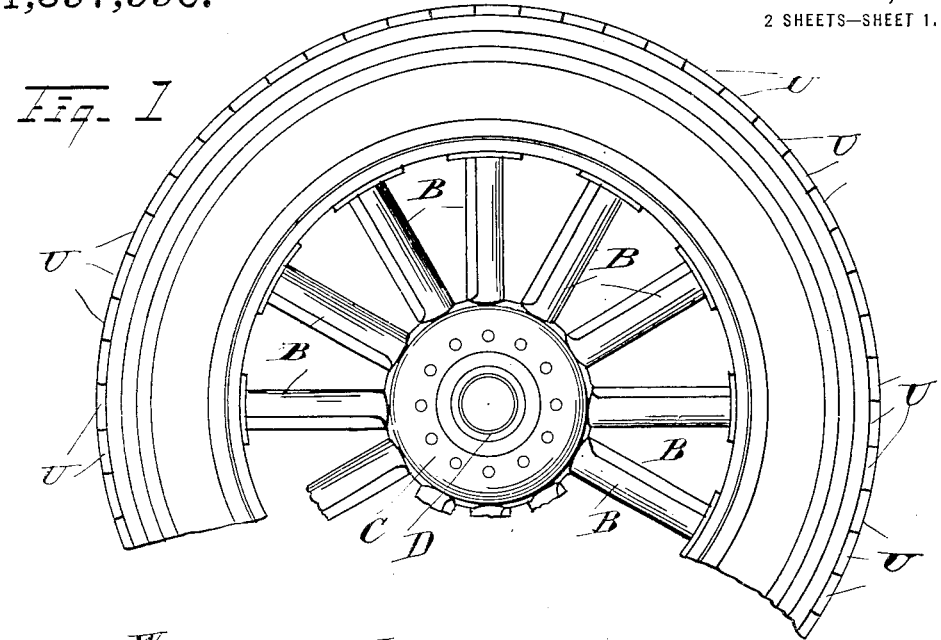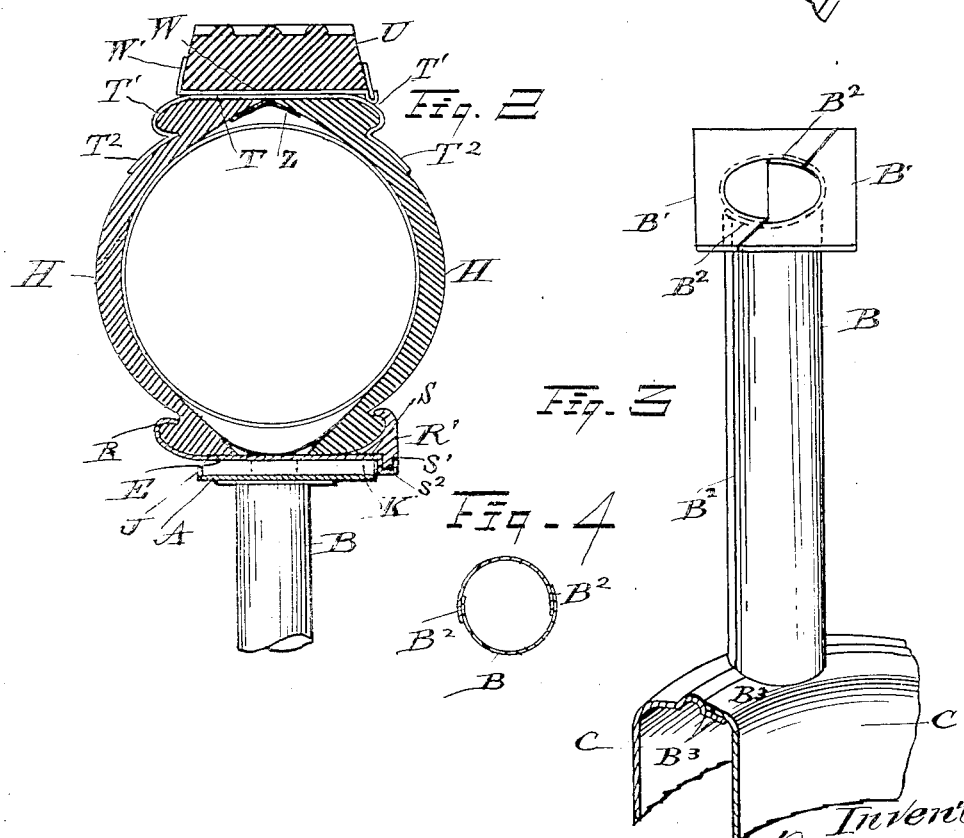

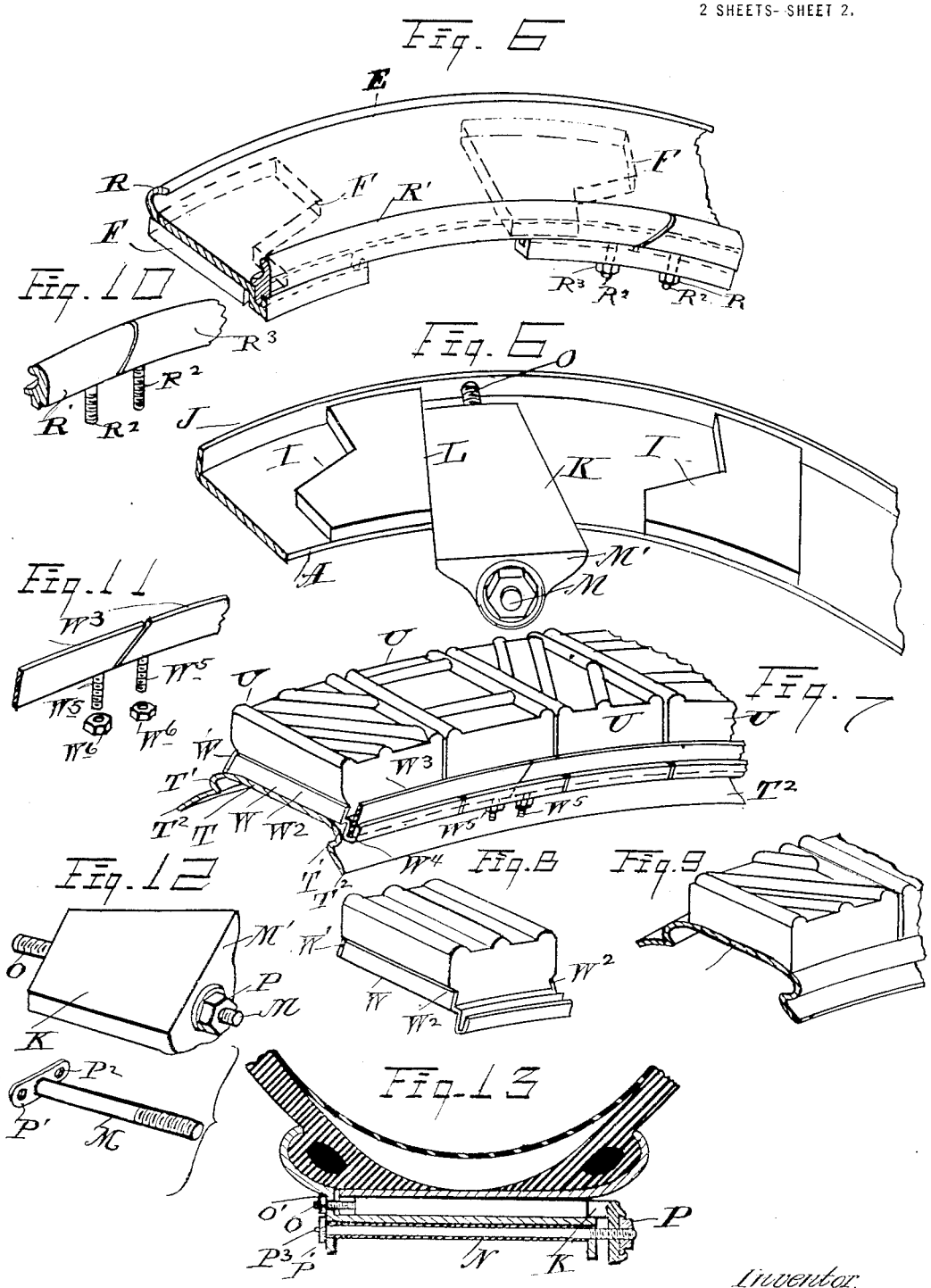

ROBERT WRIGHT, OF CLEVELAND, OHIO.

AUTOMOBILE-WHEEL RIM AND TIRE.

1,397,996.  Specification of Letters Patent.  Patented Nov. 22, 1921.

Application filed January 15, 1917. Serial No. 142,429.

*To all whom it may concern:*

Be it known that I, ROBERT WRIGHT, a citizen of the United States, and resident of Cleveland, in the county of Cuyahoga and State of Ohio, have invented certain new and useful Improvements in Automobile-Wheel Rims and Tires, of which I hereby declare the following to be a full, clear, and exact description, such as will enable others skilled in the art to which it appertains to make and use the same.

The objects of the invention are to provide an improved form of protected tire or casing divided on a central circumferential line to form two equal portions, and reinforced at the tread side, so that it cannot be punctured, and further protected upon each side of the tread surface, so that it cannot be punctured and further protected upon each side of the tread surface, so that it cannot readily be cut or broken when it is deflated, and consequently flattened.

The invention includes a two part casing, having clencher or other retaining edges of well known form, at both rim and tread edges, and also includes outer and inner tire holding rims therefor which secure the two parts of the tire together.

It includes resilient tread blocks providing puncture proof surfaces and which are easily replaceable when worn out, thus making the tread surface more durable than if it formed an integral portion of the casing.

The invention also includes a wheel felly and felly band, the said felly band provided with circumferentially disposed spaced wedge members on its outer face and an inner rim member securing the tire edges together and provided with reversely extending spaced wedges, which permit the rim and tire to be detachably secured to said felly band.

It also includes means for detachably securing the divided casing or tire upon the inner rim and for securing the tread blocks upon the outer rim.

It also includes the combination and arrangement of parts and construction of details hereinafter described, shown in the accompanying drawings, and specifically pointed out in the claims.

In the accompanying drawings Figure 1 is a fragmentary side elevation of the completed wheel; Fig. 2 is a transverse section of the outer and inner rims, two part casing and tread blocks; Fig. 3 is a perspective view of one of the metal wheel spokes; Fig. 4 is a transverse section thereof; Fig. 5 is a perspective view of a portion of the demountable rim showing some of the wedges on the underside thereof in dotted lines; Fig. 6 is a similar view of a portion of the felly band showing the circumferential wedges thereon; Fig. 7 is a perspective view of the outer or tread rim, showing the detachable tread blocks thereon, and fastening means therefor; Fig. 8 is a similar view of a single block and its support which is secured to said outer rim; Fig. 9 is a similar view illustrating a form in which the tread is vulcanized directly to the tread rim; Fig. 10 is a perspective showing detail of split tire retaining ring; Fig. 11 is a similar view showing the split retaining ring for the detachable tread blocks; Fig. 12 is a perspective of the retaining wedge and its bolt for preventing displacement of the demountable rim when assembled upon the felly band; Fig. 13 is a transverse section of a modified form of rim.

In these views reference being made to Figs. 1 and 2, A represents a felly band, to which sheet metal spokes B, B, are attached by spot welding or other suitable means.

These spokes are formed of semi-cylindrical plates which (alternately) overlap (and underlap) at their edges $B^2$ (for convenience in assembling,) and are attached to annular overlapping plates C, C, to which the hub D is attached and which overlap at $B^3$ $B^3$. At their outer edges integral plates B' are attached to the band A.

E is a demountable rim sleeved over the felly band A and radially spaced therefrom. The outer face of the band is provided with circumferentially directed wedges I, I, spaced about its periphery. To the demountable rim E the tire or casing members H, H, are attached.

The inner circumference of this rim is provided with spaced reversely positioned wedges F, F, which interlock with the wedges I, I upon the felly band when the parts are assembled.

The rim is positively alined upon the felly band by means of a marginal flange J upon the felly band against which the wedges upon the rim abut and which prevents any lateral or loose twisting motion of the rim upon the band, and the two members are forced into secure contact with each other by means of a transverse wedge K, one edge of which engages with the inclined face L of one of the wedges on the felly band. This wedge is inserted between the two inclined surfaces and the band is forced thereby circumferentially around the felly band until the wedges on the rim are tightly in engagement with the wedges on the felly band.

The adjustment is produced by means of the bolt M which passes through a depending ear M' upon the wedge and through a tube N secured to the lower face of the felly band. The tube is useful since no amount of pressure upon the wedge will bend or distort it since the pressure is longitudinally directed.

A bolt like extension O of this wedge passes through the flange J in the band and a nut O' is ordinarily placed thereon. A nut P secures the front extremity of the bolt M and it is preferably swiveled in the bent over ear M upon the wedge K. The inner end of this bolt is provided with a T shaped extension P' which is provided with openings P² that slip over pins P³ in the adjacent flange.

The tire or casing members are substantial duplicates and may be of clencher form at their rim edges as shown, or may be of other forms.

In Fig. 2 the inner edge of the rim is provided with the tire retaining flange R, and a detachable split ring R' secures the outer edge of the tire.

This ring is provided with radially projecting studs R², R² which extend through openings in the rim edge and are secured by means of nuts R³, R³. This ring is preferably provided with shoulders S', S' which rest upon the walls of the groove S² in which the ring is set, thus giving the ring a firm bearing.

The tread or outer edges of the divided tire are secured by means of a "clencher" rim T the retaining edges T' of which are laterally extended at T² to support it when deflated so that it will not become rim cut or punctured.

Upon this outer rim T are secured a series of closely approximated blocks U, U, of resilient but solid rubber or other vulcanizable preparation which form the actual tread surface upon which the tire runs, and which with the metal rim T form a puncture proof belt encircling the tire upon which the weight of the car is received.

To attach these blocks U plates W, W' may be spot welded or brazed to the rim T and the blocks may be detachably secured thereto by means of the rear flanges W', W', side flanges W², W² and a split ring W³, which is inserted in the annular groove W⁴ in each plate W.

Studs W⁵, W⁵ project through the bottom of this groove and nuts W⁶, W⁶ secure them in place. The tread surfaces of said blocks are provided with "non skid" ridges arranged as shown in my previous patents.

In Fig. 9 a modified form is shown where the blocks U, U are vulcanized directly upon the plate W. The detachable form however is believed to be the most desirable since worn or injured blocks can readily be replaced when desired.

In Fig. 3 the construction of the spokes is shown where the semi-tubular spoke portions each have a part of the plate B', B' integral therewith.

The edges of the spoke and plate portions overlap at B² and are spot welded or brazed together and a central hollow drum composed of side plates is similarly constructed with overlapping edges at B³ attached together and preferably integral therewith.

In Fig. 13 a modified form is shown in which the felly band is provided with a clencher edge and the inner edge of the opposing rim section is provided with a corresponding clencher edge so that when drawn together the tire in a deflated condition will be inclosed between them.

In Fig. 2 a fabric band Z is shown connecting the two outer clencher edges to prevent pinching the inner tube. This can easily be cut in two if it is necessary to take out one portion.

Having described the invention what I claim as new and desire to secure by Letters Patent is:—

1. The combination of a felly band provided with depending flanges, a transverse tube extending between and supported by the said flanges, a tire holding rim sleeved on and spaced from the felly band, opposed interlocking wedges arranged in the space between the band and the rim and secured at intervals to the outer face of the band and the inner face of the rim, an adjustable wedge extending transversely of the rim in the band substantially entirely across the said space and engaging one of the said wedges for forcing the opposed wedges into interlocked relation, an adjusting screw extending through the said tube and interlocked at one end with the felly band and provided at the other end with a nut engaging the adjustable wedge.

2. The combination of a felly band provided with marginal flanges and having projecting pins at one side, a transverse tube extended between and supported by the said flanges, a tire holding rim sleeved on and spaced from the said band, opposed wedges arranged at intervals and secured to the outer face of the band and to the inner face of the rim, an adjustable transverse wedge extending substantially across the space between the band and the rim and provided at one end with a screw for connecting it with one of the said parts and having a radially projecting ear extending from its other end, a bolt passing through the said tube and provided at one end with means for interlocking it with the said pins and having its other end threaded and extending through the said ear and a nut swiveled on the said ear and engaging the threaded end of the screw for adjusting the said wedge.

In testimony whereof, I hereunto set my hand this 9th day of January, 1917.

ROBERT WRIGHT.

In presence of—
RALPH W. JEREMIAH,
WM. M. MONROE.